United States Patent
Ino

(10) Patent No.: US 6,640,405 B2
(45) Date of Patent: Nov. 4, 2003

(54) RING INSTALLATION METHOD AND RING INSTALLATION JIG

(75) Inventor: Shinobu Ino, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/234,209

(22) Filed: Sep. 5, 2002

(65) Prior Publication Data

US 2003/0009871 A1 Jan. 16, 2003

Related U.S. Application Data

(62) Division of application No. 09/805,939, filed on Mar. 15, 2001.

(30) Foreign Application Priority Data

Jan. 26, 2001 (JP) ............................................ 2001-19063

(51) Int. Cl.[7] .............................................. B23P 19/04
(52) U.S. Cl. ...................... 29/229; 29/235; 29/243.56; 29/451; 29/522.1
(58) Field of Search ........................ 29/235, 229, 270, 29/278, 280, 282, 446, 450, 451, 522.1, 243.56

(56) References Cited

U.S. PATENT DOCUMENTS

| | | | | |
|---|---|---|---|---|
| 1,280,887 A | * | 10/1918 | Smith | 29/243.56 |
| 2,382,359 A | * | 8/1945 | Weightman | 29/282 |
| 3,030,700 A | * | 4/1962 | Jensen | 29/229 |
| 3,268,993 A | * | 8/1966 | Conner | 29/816 |
| 3,347,083 A | * | 10/1967 | Turpin et al. | 72/393 |
| 4,144,631 A | * | 3/1979 | Fujio | 29/446 |
| 4,182,578 A | | 1/1980 | Livesay et al. | 403/317 |
| 4,325,172 A | * | 4/1982 | Holdaway | 29/235 |
| 4,571,804 A | * | 2/1986 | Grabler et al. | 29/235 |
| 5,083,363 A | * | 1/1992 | Ransom et al. | 29/523 |
| 5,103,548 A | * | 4/1992 | Reid et al. | 29/507 |
| 5,343,607 A | * | 9/1994 | Southerland et al. | 29/229 |
| 5,392,505 A | * | 2/1995 | Harada | 29/450 |
| 5,601,540 A | * | 2/1997 | Stevens | 604/533 |
| 5,875,536 A | * | 3/1999 | Ring | 29/407.1 |
| 6,413,197 B2 | * | 7/2002 | McKechnie et al. | 482/146 |
| 6,507,985 B1 | * | 1/2003 | Loughlin et al. | 29/229 |

FOREIGN PATENT DOCUMENTS

| | | | | |
|---|---|---|---|---|
| FR | 2597772 A1 | * 10/1987 | | 29/229 |
| JP | 5-79548 | 11/1993 | | |
| JP | 6-23512 | 6/1994 | | |
| JP | 2001-20925 | 1/2001 | | |
| JP | 2001-10552 | 1/2002 | | |
| WO | WO 84/03676 | 9/1984 | | |

\* cited by examiner

*Primary Examiner*—Gregory Vidovich
*Assistant Examiner*—Essama Omgba
(74) *Attorney, Agent, or Firm*—Armstrong, Westerman & Hattori, LLP.

(57) ABSTRACT

A ring installation method and a ring installation jig which are capable of performing an installation operation with high efficiency in which an anti-slip-off ring made of an elastic metal material is uniformly expanded to be fitted on a pin's end and pushed to an engagement position to be mounted thereon. The jig has (i) an expansion guide member which has, at its front, a working face to be brought into contact with an end of a chain-coupling pin for positioning and has a ring expansion guide section on its outer periphery and to which a propulsive force is applied; (ii) an expansion claw fitted on the expansion guide member for expanding and supporting the anti-slip-off ring and moving it to the pin's end; (iii) an elastic body for applying a pressing force to the expansion claw; and (iv) a pusher for pushing the anti-slip-off ring which has been expanded by the expansion claw into an annular space defined by a link of the chain and the pin.

7 Claims, 10 Drawing Sheets

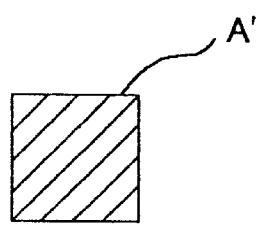 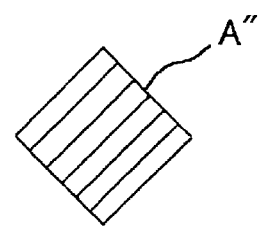
F I G. 8A    F I G. 8B

RING INSTALLATION METHOD AND RING INSTALLATION JIG

This application is a divisional application of prior application Ser. No. 09/805,939 filed Mar. 15, 2001.

TECHNICAL FIELD

The present invention relates to a ring installation method and a ring installation jig used for assembling an anti-slip-off ring into a joint part at which a link and a link coupling pin are coupled to each other, when assembling a link chain that constitutes a crawler belt particularly for use in a crawler-mounted construction machine.

BACKGROUND ART

As shown in FIG. 9, a known crawler belt 1 for use in construction machines such as hydraulic excavator and bulldozers is comprised of a plurality of track shoes 2 that serve to contact the ground. The track shoes 2 are respectively attached, by means of attachment bolts, to links 4 that constitute an endless link chain 3. This link chain 3 is assembled by successively forcing link-coupling pins 6 (hereinafter simply referred to as "pin") into tubular bushings 5 such that both ends of each pin project outwards from the respective ends of the right and left links 4. In the link chain 3, the adjacent links 4 are articulately connected to each other by the pins 6 at their ends in such a condition that these ends are spaced apart from each other. At the end of each link 4, there are disposed (i) a lubricant sealing member which hermetically seals a lubricant for preventing an internal wear occurring between each pin 6 and each bushing 5 and (ii) a spacer for preventing crushing of the lubricant sealing member so that the lubricant stored within the pin 6 can be supplied to the space between the pin 6 and the bushing 5.

The link chain 3 of such a crawler belt 1 exerts a great force on the pins 6 in a thrusting direction, when the crawler belt 1 is in service. Therefore, each pin 6 is provided with an anti-slip-off means at both ends thereof. A typical anti-slip-off means for the pin 6 is designed such that a groove is inscribed in its circumferential direction in both ends of the pin 6 and an anti-slip-off ring is fitted in each groove so as to prevent the pin 6 from falling out. Herein, an expandable/contractible ring made of an elastic metal material such as snap rings is used as the anti-slip-off ring.

Japanese Patent Application No. 11-182264 (1999) associated with a previous invention filed by the inventors of the present invention discloses a means for preventing slip-off of pins in the link chain of a crawler belt, as a fixing arrangement for crawler belt links and pins. In the previous invention, as shown in FIGS. 10A, 10B, a link chain 3 has annular space sections 9 each of which is formed between the periphery of the open end of a pin insertion hole 7 in each of right and left links 4 and an end of a pin 6. An anti-slip-off ring A is fitted in each annular space section 9 so that the pin 6 is prevented from moving in its axial direction and falling out. For this arrangement, the periphery of the open end of each pin insertion hole 7 has a tapered inner face 7a which gradually expands outwardly from the pin insertion hole 7. The pin 6 has, at both ends thereof, a tapered outer face 6b which faces the tapered inner face 7a. The inclination angle of the tapered outer face 6b with respect to the axial center line of the pin 6 is slightly smaller than the inclination angle of the tapered inner face 7a. Each annular space portion 9 defined by the tapered outer face 6b and the tapered inner face 7a expands outward in a flared fashion. The anti-slip-off ring A is circular in section and assumes the form of a partly cut-away annular ring. In addition, the anti-slip-off ring A is made of an elastic metal material so that it can be expanded and contracted, increasing and decreasing in diameter.

As described earlier, in the conventional crawler belt 1, the anti-slip-off ring A, which is used as a means for preventing the slip-off of the pin 6 for coupling the link chain 3, is formed from an elastic metal material. When mounting the anti-slip-off ring A in a groove formed at an end of the pin or a recess defined by the inclined surfaces, such an operation becomes necessary that the ring A is enlarged (i.e., expanded in diameter) so as to be wider than the diameter of the pin 6 and then pushed inward. In cases where the aforesaid snap ring is fitted in the groove formed at the end of the pin as the anti-slip-off ring, the snap ring is first expanded by widening a ring enlargement hole formed at the ring's ends, using known pliers which is a specialized tool for mounting a snap ring, and then fitted in the pin engagement groove. In this case, the workman has to manually attach the snap ring one by one. Since the width of the groove into which the ring is to be fitted should be provided with a margin in order to facilitate the fitting of the ring into the groove, the pin moves the distance corresponding to the margin after the installation of the ring. In addition, there is such a risk that if great external force is exerted in a thrusting direction, the anti-slip-off ring or the groove might be broken, resulting in falling out of the pin.

Since the anti-slip-off ring A used in the anti-slip-off means is in the form of a partly cut-out annular ring having a circular section and is made of an elastic metal material, when expanded by a specialized tool similar to the aforesaid pliers, the ring A cannot be uniformly enlarged but is just widened at its cut-out portion because of its inherent structure. Therefore, an extremely large power is necessary for the expansion of the ring so that the ring fitting work needs to be carried out by substantially two workers and it takes a long time (about 3 minutes) to fit one ring. As a result, sequential operations for coupling a number of links involves prolonged assembling which inevitably entails increased cost. Another problem is that it is currently difficult to automate the process of mounting the anti-slip-off rings.

The present invention is directed to overcoming the above problems and a prime object of the invention is therefore to provide a ring installation method capable of efficiently carrying out an operation when expanding an anti-slip-off ring and mounting it on an end of a link coupling pin, the operation being such that the anti-slip-off ring can be uniformly widened to be fitted on the end of the pin, then pushed until it reaches an engagement position and mounted thereat. Another object of the invention is to provide a ring installation jig used for carrying out the above ring installation method.

DISCLOSURE OF THE INVENTION

In accomplishing the above prime object, there has been provided, in accordance with the invention, a ring installation method for mounting an anti-slip-off ring used for securely attaching a link coupling pin to links in a crawler belt of a vehicle, wherein the anti-slip-off ring is mounted on an annular open space defined between an open end of a pin insertion hole in a link and an insertion end of the pin exposed within the open end, by pressing the anti-slip-off ring against the outer periphery of an end of the pin while the anti-slip-off ring is expanded and by pushing the anti-slip-off ring in its expanded state with a pusher to slide it from the end of the pin to a predetermined position.

According to the invention, when successively coupling links with coupling pins during a link-chain assembling operation, an anti-slip-off ring is mounted on an insertion end of a pin, the insertion end being exposed within the open end of a pin insertion hole in a link. For installing the anti-slip-off ring, the anti-slip-off ring is firstly expanded from its bore side by use of a ring installation jig so as to be brought into a condition in which the ring can be fitted on the outer periphery of the pin. The ring is then pressed against the outer periphery of the pin's end. With this procedure, the anti-slip-off ring is substantially uniformly expanded so that it can be easily fitted on the pin. Thereafter, the anti-slip-off ring is slid to a predetermined position on the pin by pushing it with a pusher while the ring being kept in its expanded condition. This allows the anti-slip-off ring to be pushed to the predetermined position on the end of the pin without difficulty. After the anti-slip-off ring has been pushed into an inwardly tapered-down annular space defined by the open end of the pin insertion hole of the link and the exposed end of the pin, the anti-slip-off ring is contracted so that the ring is readily brought into tight contact with the inner circumferential surface of the pin insertion hole of the link and with the peripheral surface of the pin. As a result, the pin can be fixed so as not to move in a thrusting direction.

According to the invention, for mounting an anti-slip-off ring, which is made of an elastic metal material and partly cut away, on the end of a pin located within a pin insertion hole of a link of a chain, the ring is expanded from its bore side and pressed against the outer periphery of the end of the pin while being kept in the expanded condition and then pushed into a predetermined position, using a pusher. With such two-stage operation, the anti-slip-off ring can be easily, positively installed. Accordingly, the invention has the effect of increasing operational efficiency and therefore workability.

Preferably, the axial center of the anti-slip-off ring is coincident with the axial center of the pin during a process in which the anti-slip-off ring is expanded until its bore becomes larger than the outer diameter of the pin, and kept in the expanded condition. With this arrangement, the two processes, which are the expansion/keeping of the anti-slip-off ring and the pushing/mounting of the anti-slip-off ring, can be continuously carried out by stages on the axial line of the coupling pin so that the anti-slip-off ring can be smoothly installed in the anti-slip-off position without difficulty.

The above-described ring installation method is carried out, in accordance with the invention, by a ring installation jig for mounting an anti-slip-off ring used for securely attaching a link coupling pin to links in a crawler belt of a vehicle, the jig comprising:
an expansion guide member which has, at its front, a working face to be brought into contact with an end of the pin for positioning and has a ring expansion guide section on its outer periphery and to which a propulsive force is applied;
an expansion claw fitted on the expansion guide member for expanding and supporting the anti-slip-off ring and moving it to the end of the pin;
an elastic body for applying a pressing force to the expansion claw; and
a pusher for pushing the anti-slip-off ring which has been expanded by the expansion claw into an annular open space defined by a link and the pin.

According to the invention, in the process of assembling a link chain which constitutes a crawler belt, the ring installation jig is positioned outside the pin coupling section by a supporting structural member, with its axis being orthogonal to the assembly line of the link chain. After the anti-slip-off ring has been fitted on the outer periphery of the leading end of the expansion claw, the ring installation jig is moved forwards to the end of the pin by a propulsion means, the pin being coupled to the assembled link chain. When the leading end of the expansion guide member has been brought into contact with the end of the pin, the leading end of the expansion guide member fits to a recess formed at the center of the pin's end with the axial center of the expansion guide member (ring installation jig) being coincident with the axial center of the pin. Then, the ring installation jig is further forwarded by the propulsion means. At that time, while the expansion guide member in contact with the pin's end is stationary, the expansion claw located outside the expansion guide section is pushed forward by a pressing force imposed on a housed elastic body and, at the same time, radially enlarged by the expansion guide section.

The enlargement of the expansion claw allows the anti-slip-off ring fitted thereon to expand. When the expansion claw stops after advancing until it comes in contact with the pin's end face, the expansion claw has been enlarged with its bore becoming at least slightly larger than the outer diameter of the pin opposite to the expansion claw. Thereafter, the pusher is urged thereby pushing the anti-slip-off ring which is positioned at the leading end of the pusher, riding on the expansion claw, so that the anti-slip-off ring is shifted onto the pin's end. As the pusher travels forward by a specified stroke in this condition, the anti-slip-off ring is pushed into the annular space defined by the pin's end and the opening of the pin insertion hole of the link. In this annular space section, the pin is provided with a groove which is tapered such that the diameter of the pin increases towards its open side. Upon entering this groove, the pushed anti-slip-off ring is released from its expanded condition, decreasing in diameter so that it comes in contact with the inner circumferential surface of the pin insertion hole of the link and with the inclined groove surface of the pin and, consequently, it is securely installed. It should be noted that when the ring installation jig has been moved back after mounting the anti-slip-off ring on the predetermined position of the pin's end, the pusher as well as the expansion claw are pushed back by the restoring force of the housed elastic body, so that the ring installation jig becomes ready for the next operation.

According to the invention, since the expansion of the anti-slip-off ring and the shift of the anti-slip-off ring onto the pin's end after the expansion and pushing of it to the predetermined position by the pusher can be carried out serially, the same effect as obtained by the above-described ring installation method can be achieved. Additionally, the ring installation jig of the invention can attain the foregoing object with a simple structure composed of a small number of parts so that it can be manufactured at low cost, contributing a reduction in equipment cost.

The invention is preferably designed such that the ring expansion guide section has sliding surfaces composed of a first tapered circumferential portion, a first circumferential portion, a second tapered circumferential portion and a second circumferential portion respectively, whereas the expansion claw has sliding surfaces composed of a tapered circumferential portion, a first circumferential portion and a second circumferential portion respectively; and such that the tapered circumferential portion, first circumferential portion and second circumferential portion of the expansion claw are in contact with the first tapered circumferential portion, first circumferential portion and second circumferential portion of the ring expansion guide section, respectively. It is preferable that, in the ring expansion guide section, the second tapered circumferential portion and the second circumferential portion have a larger diameter than the first tapered circumferential portion and the first circumferential portion, respectively. This arrangement has such an effect that the expansion of the anti-slip-off ring is carried out by the first tapered circumferential portion, whereas the second tapered circumferential portion and the second circumferential portions positively carry out the shift of the expanded anti-slip-off ring onto the pin's end by the pusher.

The expansion claw is in the form of a cylinder divided into a plurality of parts and can be moved to the end of the pin with the anti-slip-off ring fitted thereon. With this arrangement, the anti-slip-off ring formed from an elastic metal material can be substantially equally expanded from its bore side and fitting of the anti-slip-off ring on the pin's end can be more positively carried out. In addition, the elastic body may be made of urethane. Alternatively, the elastic body may be formed from a coil spring. This advantageously makes the entire structure of the ring installation jig small.

Further, it is preferable to dispose the ring installation jig on both sides of an assembly line for the link chain, such that the right and left jigs are positioned with a common axis, facing each other and can be simultaneously actuated. With this arrangement, the anti-slip-off rings can be mounted on both ends of the link coupling pin at the same time, whereby propulsive forces imposed on the pin can be offset to mount the anti-slip-off rings in a stable condition, which consequently enables reasonable operation.

BRIEF DESCRIPTION OF THE DRAWINGS

FIG. 8(A) is a sectional view of an anti-slip-off ring according to another embodiment.

FIG. 8(B) is a sectional view of an anti-slip-off ring according to still another embodiment.

BEST MODE FOR CARRYING OUT THE INVENTION

Figure 1A:
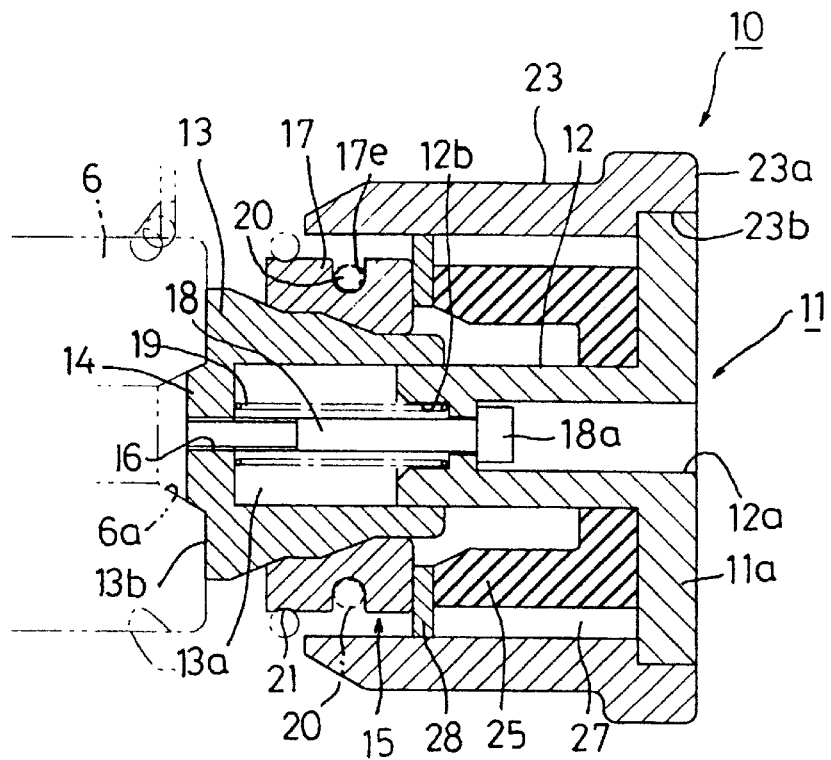
FIG. 1A is a longitudinal sectional view of a ring installation jig suitable for use in carrying out a ring installation method of the invention.

Referring now to the drawings, a ring installation method and a ring installation jig will be hereinafter described according to a preferred embodiment of the invention.

Figure 1B:
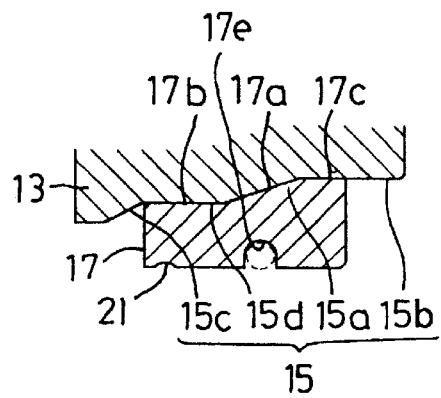
FIG. 1B illustrates the details of an expansion guide section of the jig shown in FIG. 1A.

FIG. 1A shows a longitudinal sectional view of a ring installation jig suited for use in carrying out a ring installation method according to the invention, whereas FIG. 1B shows a detailed view of an expansion guide section.

A ring installation jig 10 comprises (i) a supporting member 11 which comprises a mounting base plate 11a to be attached to a supporting structural body (not shown) and a support shaft 12 of a specified diameter projecting forward therefrom; (ii) an expansion guide member 13 which is slidably supported on the support shaft 12 of the supporting member 11, whose outer peripheral surface works as a ring expansion guide section 15, and which has a working face at the front thereof; (iii) an expansion claw 17 which is fitted on the outer periphery of the expansion guide member 13 so as to be expandable and contractible; (iv) a tubular pusher 23 whose proximal end is fitted on the outer periphery of the mounting base plate 11a of the supporting member 11 so that it is coaxially supported by the supporting member 11 and which is positioned outside the expansion claw 17; and (v) an elastic body 25 for expulsion housed in a cylindrical space 27 which is positioned in front of the mounting base plate 11a of the supporting member 11 and inside the pusher 23.

The expansion guide member 13 has a bottomed support hole 13a at its center. This support hole 13a is freely slidable relative to the support shaft 12 of the supporting member 11 and extends from the rear end side of the expansion guide member 13 in an axial direction. The expansion guide member 13 also has a positioning projection 14 positioned at the center of its front end face such that the projection 14 can be engaged with a hole end recess 6a which is provided at the center of an end face of a pin 6 for coupling a link. Formed on the outer periphery of the expansion guide member 13 is an expansion guide section 15 composed of a first circumferential portion 15b, a first tapered circumferential portion 15a, a second circumferential portion 15d and a second tapered circumferential portion 15c which are continuously formed in an axial direction such that the second tapered circumferential portion 15c has a larger diameter than the first tapered circumferential portion 15a. It should be noted that the maximum diameter of the second taper circumferential portion 15c is equal to or slightly larger than the outer diameter of the pin 6 to which the outer periphery of the expansion claw 17 (explained later) is connected, when the expansion claw 17 is brought into its final enlarged condition.

The expansion guide member 13 is slidably, undetachably connected to the supporting member 11, by screwing the leading end of a supporting bolt 18 into a screw hole 16 provided at the axial center of the expansion guide member 13 so that the support shaft 12 is fitted in the bottomed support hole 13a, the supporting bolt 18 being inserted into a stepped support hole 12a provided at the axial center of the support hole 12. The expansion guide member 13 is fitted on the shank of the supporting bolt 18 with one end being in contact with a stepped hole 12b formed at an end of the support shaft 12 while the other end is biased outwardly at all times by a coil spring 19 which is in contact with the end of the bottomed support hole 13a. A head portion 18a of the support bolt 18 is brought into contact with the stepped portion of the support hole 12a of the supporting member 11, thereby preventing the expansion guide member 13 from falling out, and the position where the head portion 18a abuts against the stepped portion serves as a neutral position.

The expansion claw 17 is in the form of a cylinder having a specified length and is circumferentially equally divided into three parts (the number of divided parts is not limited to three). A groove 17e is formed at the middle position of the peripheral surface of the expansion claw 17, extending in a peripheral direction. Fitted in the groove 17e is a ring 20 formed from an endless coil spring ring which prevents disassembling of the expansion claw 17 and the expansion guide member 13. The leading end of the peripheral face of the expansion claw 17 is slightly recessed to form a retention portion 21 for retaining a ring to be fitted therein. Formed on the inner circumferential surface of the expansion claw 17 are a tapered circumferential portion 17a, a second circumferential portion 17b, and a first circumferential portion 17c, the tapered circumferential portion 17a being positioned between the second and first circumferential portions 17b, 17c. The configurations of these circumferential portions 17a, 17b, 17c correspond to the configuration of the expansion guide section 15 formed on the peripheral face of the expansion guide member 13. The bore of the second circumferential portion 17b is equal to the maximum bore of the tapered circumferential portion 17a.

The pusher 23 is positioned outside an assembled structure constituted by the expansion guide member 13 and the expansion claw 17 fitted on the outer periphery of the expansion guide member 13. The pusher 23 is a tubular body slightly larger than the outer diameter of the pin 6 and has, at the inner circumferential surface of its proximal end 23a, a stepped portion 23b which is fitted and supported on the outer periphery of the mounting base plate 11a of the supporting member 11. The pusher 23 has an inclined portion at the outer periphery of its leading end, so that the pusher 23 does not come into contact with the inner wall of a pin insertion hole of a link 4 when it pushes the ring therein.

The elastic body 25 disposed inside the pusher 23 is positioned in the space 27 between the front surface of the mounting base plate 11a of the supporting member 11 and the read end of the expansion claw 17. The elastic body 25 is molded into a tubular shape, using urethane (e.g., porous urethane). The pressure bearing area of the elastic member 25 at its proximal end is widened in such a fashion that the elastic member 25 is fitted on the support shaft 12, and the leading end of the elastic member 25 is thinned so as not to contact the expansion guide member 13 and always kept in contact with the read end face of the expansion claw 17 through a spacer ring 28. As the elastic member 25, a coil spring may be used if necessary. If a stronger pressing force is required, coned disc springs may be used in combination.

Figure 2:
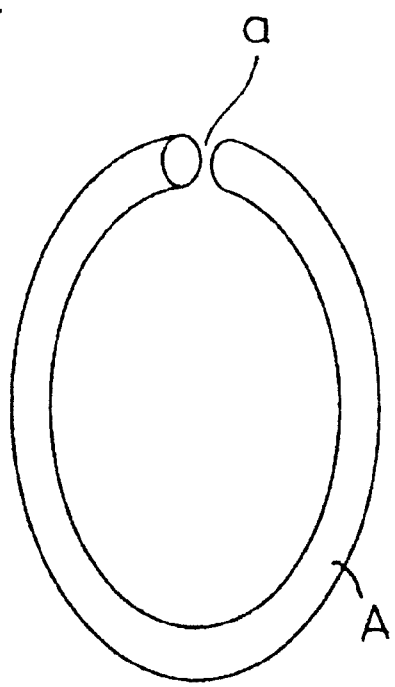
FIG. 2 is a perspective view showing one example of an anti-slip-off ring used herein.

As an anti-slip-off ring to be mounted on the end of the pin 6 by use of the above-described ring installation jig 10, the ring A shown in FIG. 2 is generally used, which is formed by making an elastic metal material circular in section into a ring form and cutting a part a away from the ring. The diameter of the anti-slip-off ring A when it is contracted has such a size that the ring A can be fitted and fixed in an engagement groove formed on the end of the pin.

Figure 3:
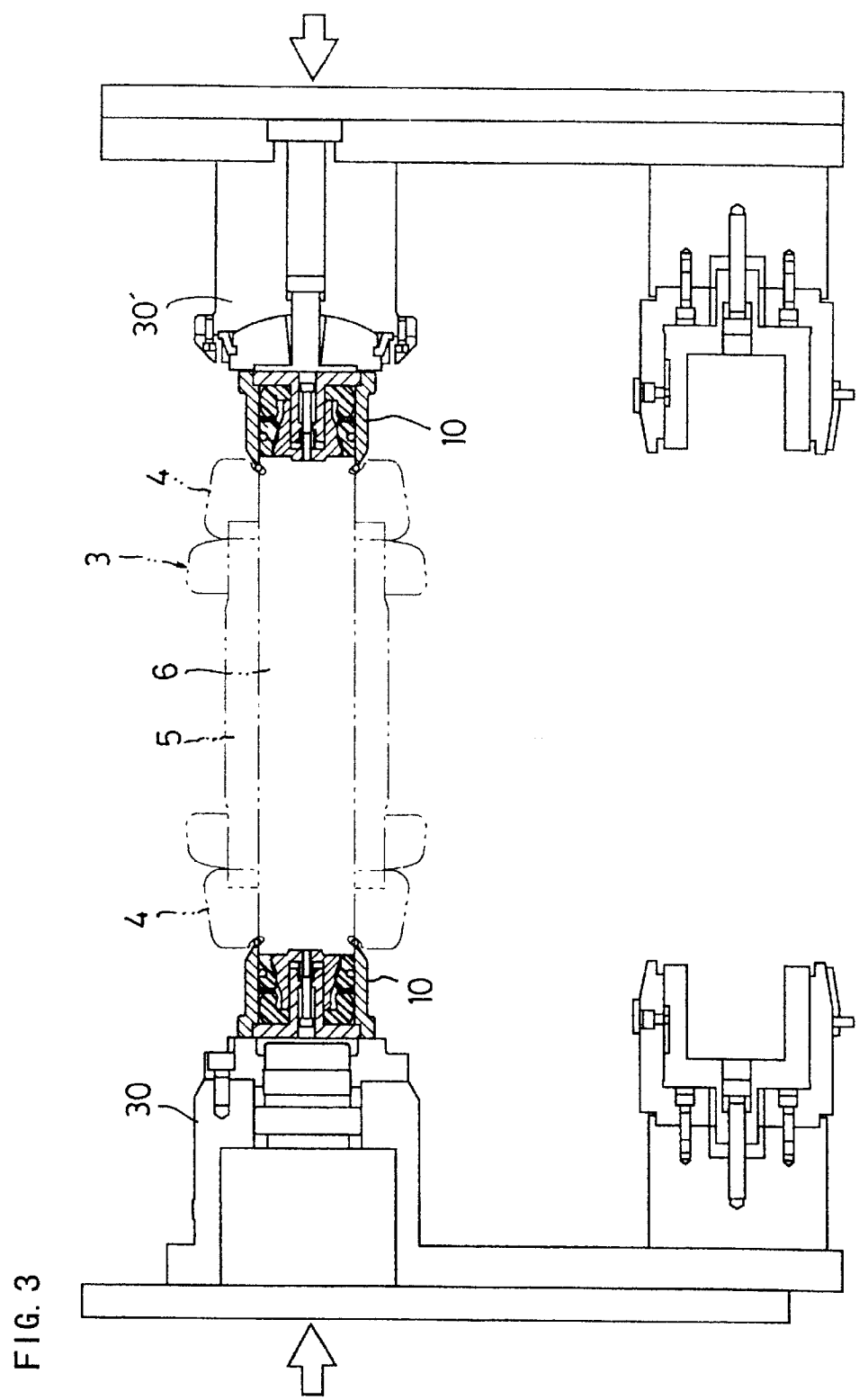
FIG. 3 illustrates an example of the layout of the ring installation jigs.

For mounting the anti-slip-off ring A on the coupling position where the pin is coupled to the link chain, by use of the thus-formed ring installation jig 10, the ring installation jig 10 is placed besides an assembly line (not shown) for the link chain, with the axis of the ring installation jig 10 being orthogonal to the assembly line. A preferable procedure taken herein is as follows: while the ring installation jigs 10 being positioned so as to face each other with their axes being aligned on the common line as shown in FIG. 3, the respective rear ends of the supporting members 11 are attached to supporters 30, 30' respectively such that the jigs 10 can be moved to and fro specified distance by a propulsive driving means (not shown). In the embodiment shown in this figure, two operations are simultaneously carried out. That is, an anti-slip-off ring is mounted on the pin 6 at one pin coupling position of the link chain 3 being assembled, while assembling of the next link is carried out at the other pin coupling position. In the following description, installation of the anti-slip-off ring A is mainly explained. It should be noted that one (30') of the supporters 30, 30' to which the ring installation jigs 10 are attached and supported has an aligning function for aligning the axial centers of the ring installation jig 10 and the pin 6.

Figure 10A:
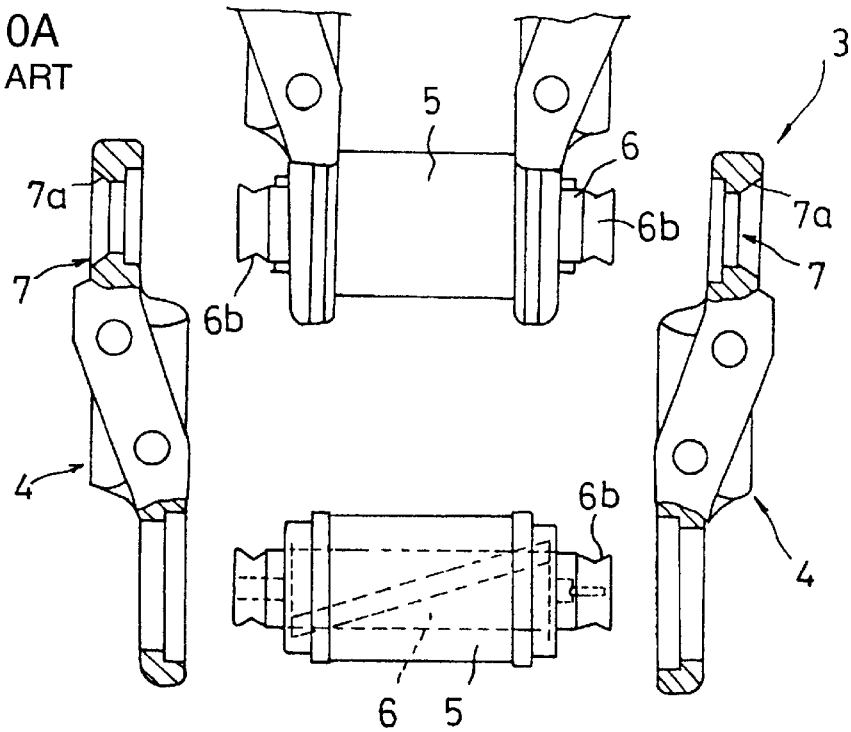
FIG. 10A is a partly broken exploded view showing a part of a link chain in a disassembled condition.
Figure 10B:
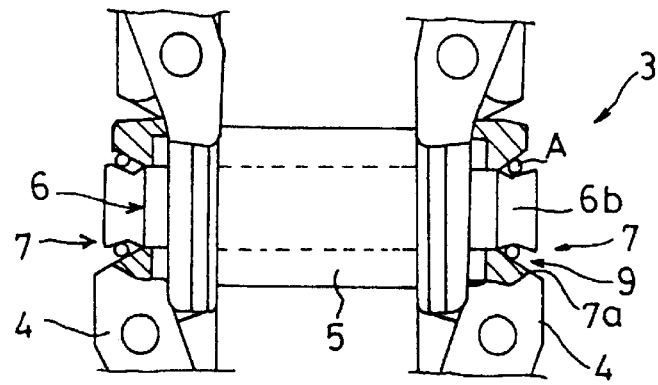
FIG. 10B illustrates a fixed arrangement of a pin at a link coupling section.

In the assembly line, the pin 6 is fitted in a bushing 5 in the preceding step, and then, pin insertion holes 7, each of which is formed on one end of each of the right and left links 4, are fitted on both ends of the coupling pin 6, these pin's ends being exposed at both ends of the bushing 5. In each of the portions where such links 4 and such a pin 6 are assembled, an annular space section 9 is formed in a flared fashion so as to expand toward its opening as shown in FIG. 10B, by assembling a groove 6b of the pin 6 and an annular inclined surface 7a of the link 4. The groove 6b has, at the peripheral end of the pin 6, an inclined surface which is inclined such that the diameter of the pin 6 increases towards the tip of the pin 6. The annular inclined surface 7a is flared toward the opening of the pin insertion hole of the link 4.

Next, the procedure of mounting the anti-slip-off ring on the pin's ends of the link chain thus assembled will be explained with reference to FIGS. 4A, 4B through FIGS. 7A, 7B.

Figure 4B:
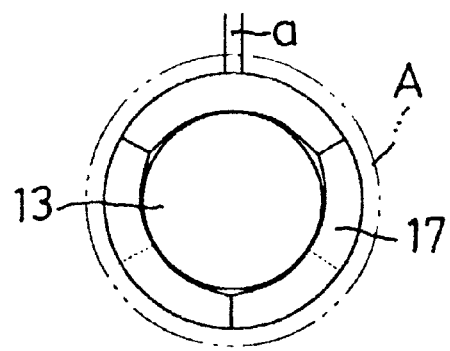
FIG. 4B is a view (1) showing the expanded condition of the anti-slip-off ring and an expansion claw at the stage shown in FIG. 4A.
Figure 4A:
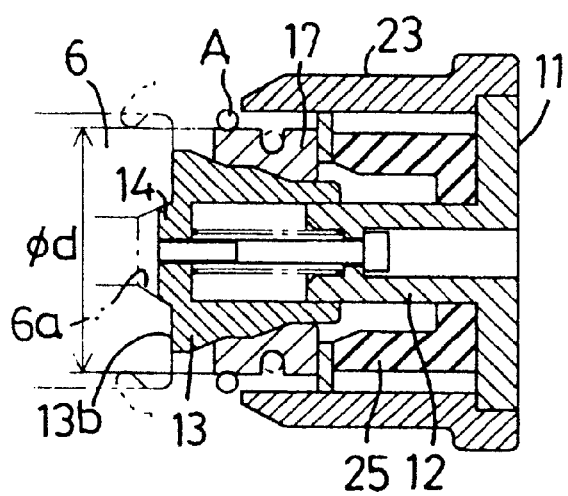
FIG. 4A is an explanatory view (1) showing a procedure for mounting the anti-slip-off ring.

As shown in FIG. 4A, the anti-slip-off ring A to be installed is first fitted on and held by the retention portion 21 formed at the leading end of the expansion claw 17 of the ring installation jig 10. At that time, the expansion claw 17 is closed as shown in FIG. 4B so that the anti-slip-off ring A can be easily fitted on the tip of the expansion claw 17. After the anti-slip-off ring A is thus retained, the ring installation jig 10 is allowed to move forward by a separated propulsive driving means (which is preferably a linear actuation mechanism such as a hydraulic cylinder). Then, the front end face (working face) 13b of the expansion guide member 13 positioned at the leading end of the jig 10 is brought into contact with the end face of the pin 6.

Figure 5B:
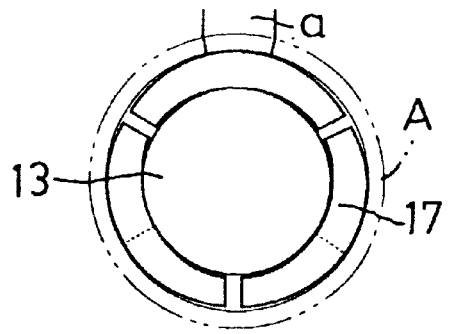
FIG. 5B is a view (2) showing the expanded condition of the anti-slip-off ring and the expansion claw at the stage shown in FIG. 5A.
Figure 5A:
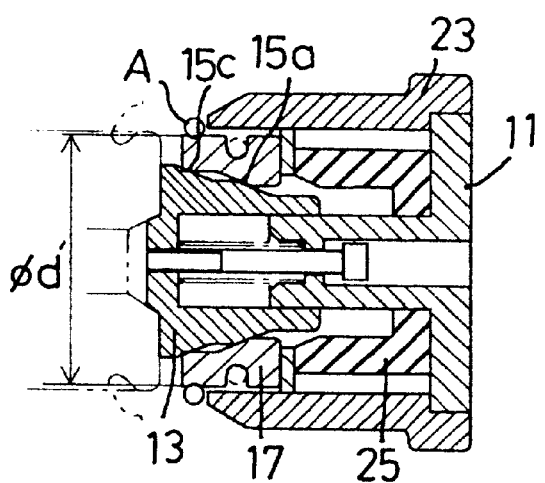
FIG. 5A is an explanatory view (2) showing the procedure for mounting the anti-slip-off ring.

When the jig 10 further moves forward, the advancement of the expansion guide member 13 is interrupted as shown in FIG. 5A so that a propulsive force is imposed on the expansion claw 17 through the elastic body 25. Thereafter, the propulsive force causes the expansion claw 17 to be slid, being released from the contact with the contact faces of the expansion guide section 15 of the expansion guide member 13 in its stationary state. While the leading edge of the second circumferential portion 17b at the inner circumferential surface of the expansion claw 17 is forcedly enlarged in a radial direction by the second tapered circumferential portion 15c of the expansion guide section 15, the tapered circumferential portion 17a is actively enlarged in a radial direction by the first tapered circumferential portion 15a of the expansion guide section 15. In this way, the inner circumference of the anti-slip-off ring A is entirely enlarged by the expansion guide member 13 and the expansion claw 17 and expanded by a substantially uniform working force. At that time, the anti-slip-off ring A is expanded with its bore changing from an initial value φd to a value φd'.

Figure 6B:
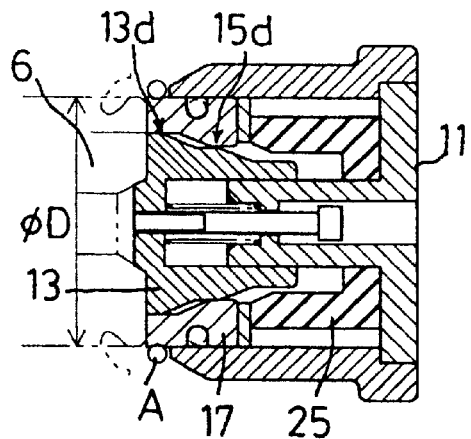
FIG. 6B is a view (3) showing the expanded condition of the anti-slip-off ring and the expansion claw at the stage shown in FIG. 6A.
Figure 6A:
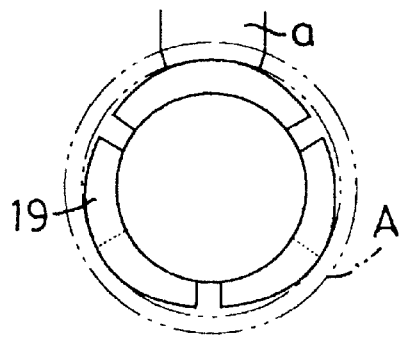
FIG. 6A is an explanatory view (3) showing the procedure for mounting the anti-slip-off ring.

When the second circumferential portion 17b of the expansion claw 17 has been urged and expanded to the position where the expansion guide section 15 has its maximum diameter, the leading end of the expansion claw 17 comes in contact with the end face of the pin 6 as shown in FIG. 6A so that its advancement is interrupted. After the jig 10 has reached this condition, the expansion claw 17 is stopped, with the second circumferential portion 17b and the first circumferential portion 17c riding over a maximum outer diameter portion 13d of the expansion guide member 13 and the second circumferential portion 15d of the expansion guide member 15, respectively, so that the anti-slip-off ring A held at the leading end of the expansion claw 17 is further expanded with its bore increasing to a value φD which is slightly larger than the outer diameter of the pin 6. As a result, the anti-slip-off ring A is maintained in its maximum expanded condition and the cut-out portion a is largely widened as shown in FIG. 6B.

After the anti-slip-off ring A has been thus enlarged (increased in diameter), the second circumferential portion 17b and first circumferential portion 17c of the expansion claw 17 are positioned at the first circumferential portion 15b and second circumferential portion 15d of the expansion guide section 15 respectively, thereby maintaining the anti-slip-off ring A in this expanded condition. If the outer periphery of the expansion claw 17 and the expansion guide section 15 are linearly tapered, the expansion claw 17 acts in its contracting direction, being reduced in diameter due to the reactive force of the expanded anti-slip-off ring. By virtue of the provision of the circumferential portions 17b, 17c and the circumferential portions 15b, 15d which function to once hold the expansion claw 17 in its enlarged condition, the anti-slip-off ring A can be securely retained without easily contracting.

Figure 7B:
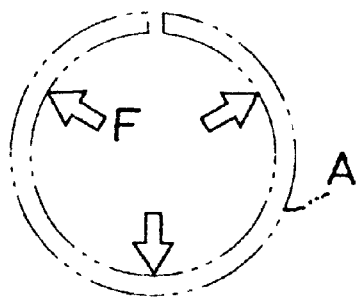
FIG. 7B is a view (4) showing the expanded condition of the anti-slip-off ring and the expansion claw at the stage shown in FIG. 7A.
Figure 7A:
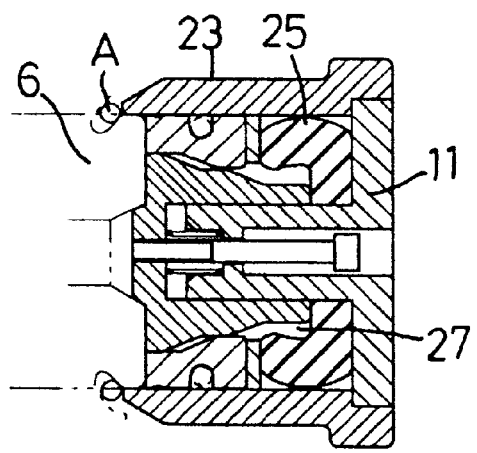
FIG. 7A is an explanatory view (4) showing the procedure for mounting the anti-slip-off ring.
Figure 9:
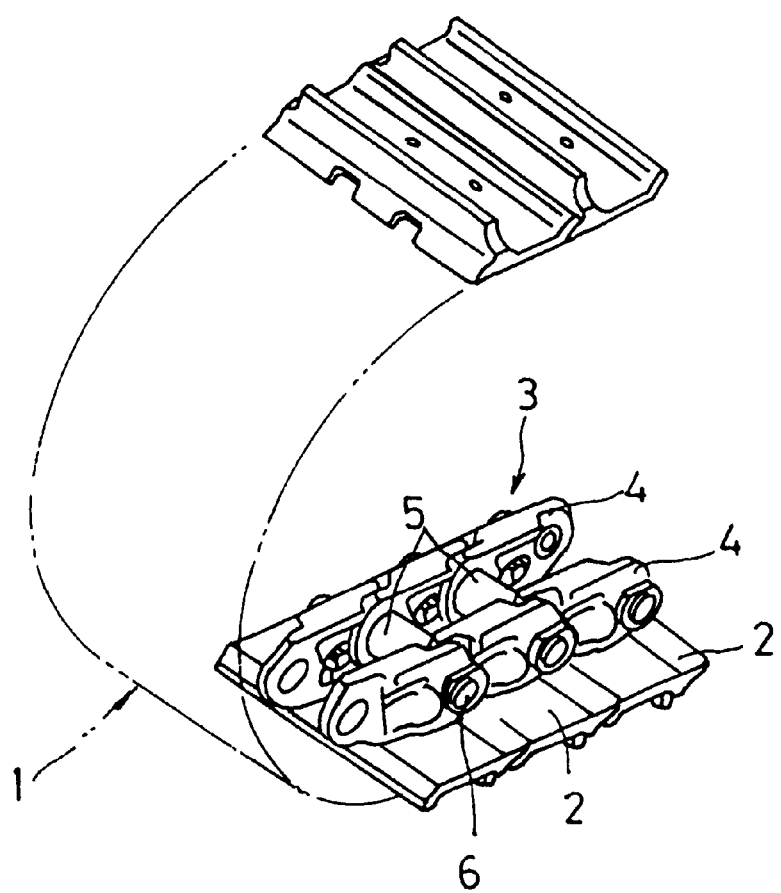
FIG. 9 is a perspective view showing a part of a crawler belt.

When a propulsive force is subsequently imposed on the ring installation jig 10, the expansion guide member 13 and the expansion claw 17 come into contact with the pin's end face, stopping their movement, so that further addition of a propulsive force allows only the pusher 23 to move forward. Then, the leading end of the pusher 23 is pressed against the anti-slip-off ring A held at the outer peripheral end of the expansion claw 17 and the pusher 23 is moved in this condition, sliding over the outer periphery of the end of the pin 6. After the anti-slip-off ring A has been pushed to a predetermined position by the pusher 23, the anti-slip-off ring A which has moved over the pin's end reaches the annular space defined by the pin 6 and the opening of the pin insertion hole of the link 4, as shown in FIG. 7A. When the anti-slip-off ring A has reached and moved into the annular space, the anti-slip-off ring A is immediately contracted by its elastic restoring force and automatically moved inward along the inclined surface since the annular space is smaller than the outer diameter of the pin 6. Thereafter, the anti-slip-off ring A reaches the position where the ring A comes into contact with the inclined surface of the pin 6 and the inclined inner surface of the link 4 so that its movement is interrupted. Then, the anti-slip-off ring A is engaged, like a wedge, with the inclined surface of the pin 6 and the inclined surface of the link 4 by its restoring and contracting action and is thus securely fixed.

Such actions successively occur without dropping off of the anti-slip-off ring A from the system in the course of the actions. Additionally, the anti-slip-off ring A is gradually expanded from its bore side, moved to the pin's end and then to the engagement position, so that the anti-slip-off ring A can be readily installed.

Since the compressed reactive force (accumulated force) of the coil spring 19 interposed between the bottomed support hole 13a and the support shaft 12 is imposed on the expansion guide member 13 in the course of the series of actions, the expansion guide member 13 is brought into the contact with the pin's end and the positioning projection 14 is engaged with the recess 6a of the pin 6, so that the installation operation can be securely performed without displacement. When the installation has been completed and the propulsive force of the propulsive driving means has been removed, the elastic member 25 compressed within the space 27 quickly pushes the pusher 23 back with its restoring force, while the restoring force of the coil spring 19 pushing the expansion guide member 13 back and returning the expansion claw 17 to its initial position. Therefore, a preparation may be made for the next installation by moving the ring installation jig 10 backward.

According to the ring installation method of the present embodiment, rings used for preventing slip-off of pins can be easily, positively installed through the assembling process for the link chain. With the above procedure, the slip-off preventing operation which has been manually carried out up to now can be automated by use of a robot. If necessary, the installation processes can be individually performed using a robot and the propulsive driving means in combination. This is particularly convenient when the installation is carried out in the maintenance of the crawler belt.

Although the invention has been particularly described with the anti-slip-off ring A having a circular section in the above description, anti-slip-off rings having other shapes in section may be used, examples of which are an anti-slip-off ring A' having a rectangular section as shown in FIG. 8A and an anti-slip-off ring A" having a rhombic section as shown in FIG. 8B.

Although not shown in the drawings, the anti-slip-off ring can be installed with the above procedure in cases where an annular groove is provided at the end of the pin and the anti-slip-off ring is fitted in this groove for preventing slip-off of the pin.

What is claimed is:

1. A ring installation jig for use in mounting an anti-slip-off ring for securely attaching a link coupling pin to links in a crawler belt of a vehicle, the jig comprising:
an expansion guide member which has, at its front, a working face to be brought into contact with an end of the pin for positioning and has a ring expansion guide section on its outer periphery, to which a propulsive force is applied;
an expansion claw fitted on the expansion guide member for expanding and supporting the anti-slip-off ring, by a contacting and sliding action of said expansion claw along said ring expansion guide section, and moving it to the end of the pin;
an elastic body for applying a pressing force to the expansion claw; and
a pusher for pushing the anti-slip-off ring which has been expanded by the expansion claw into an annular open space defined by the link and the pin.

2. A ring installation jig according to claim 1, wherein said elastic body is made of urethane.

3. A ring installation jig according to claim 1, wherein said elastic body is a coil spring.

4. A ring installation jig according to claim 1, two of which when placed one on each side of an assembly line for a link chain, such that the two jigs are positioned with a common axis and facing each other have said expansion guide member, said expansion claw, said elastic body, and said pusher arranged so as to be operable by being simultaneously actuated.

5. A ring installation jig for use in mounting an anti-slip-off ring for securely attaching a link coupling pin to links in a crawler belt of a vehicle, the jig comprising:
an expansion guide member which has, at its front, a working face to be brought into contact with an end of the pin for positioning and has a ring expansion guide section on its outer periphery to which a propulsive force is applied;
an expansion claw fitted on the expansion guide member for expanding and supporting the anti-slip-off ring, and moving it to the end of the pin;
an elastic body for applying a pressing force to the expansion claw; and
a pusher for pushing the anti-slip-off ring which has been expanded by the expansion claw into an annular open space defined by the link and the pin,
wherein said ring expansion guide section has sliding surfaces composed of a first tapered circumferential portion, a first circumferential portion, a second tapered circumferential portion and a second circumferentially portion respectively, whereas said expansion claw has sliding surfaces composed of a tapered circumferential portion, a first circumferential portion and a second circumferential portion respectively,
wherein the tapered circumferential portion, first circumferential portion and second circumferential portion of the expansion claw are in contact with the first tapered circumferential portion, first circumferential portion and second circumferential portion of the ring expansion guide section, respectively, and
wherein, in the ring expansion guide section, the second tapered circumferential portion and the second circumferential portion have a larger diameter than the first tapered circumferential portion and the first circumferential portion, respectively.

6. A ring installation jig according to claim 5, wherein the expansion claw is in the form a cylinder divided into a plurality of parts and can be moved to the end of the pin with the anti-slip-off ring fitted thereon.

7. A ring installation jig for use in mounting an anti-slip-off ring for securely attaching a link coupling pin to links in a crawler belt of a vehicle, the jig comprising:
an expansion guide member which has, at its front, a working face to be brought into contact with an end of the pin for positioning and has a ring expansion guide section on its outer periphery to which a propulsive force is applied;
an expansion claw fitted on the expansion guide member for expanding and supporting the anti-slip-off ring, and moving it to the end of the pin;
an elastic body for applying a pressing force to the expansion claw; and
a pusher for pushing the anti-slip-off ring which has been expanded by the expansion claw into an annular open space defined by the link and the pin,
wherein the expansion claw is in the form of a cylinder divided into a plurality of parts and can be moved to the end of the pin with the anti-slip-off ring fitted thereon.

* * * * *